No. 879,646.
PATENTED FEB. 18, 1908.
L. A. JONES.
FOOT REST FOR VEHICLES.
APPLICATION FILED FEB. 20, 1907.
2 SHEETS—SHEET 1.
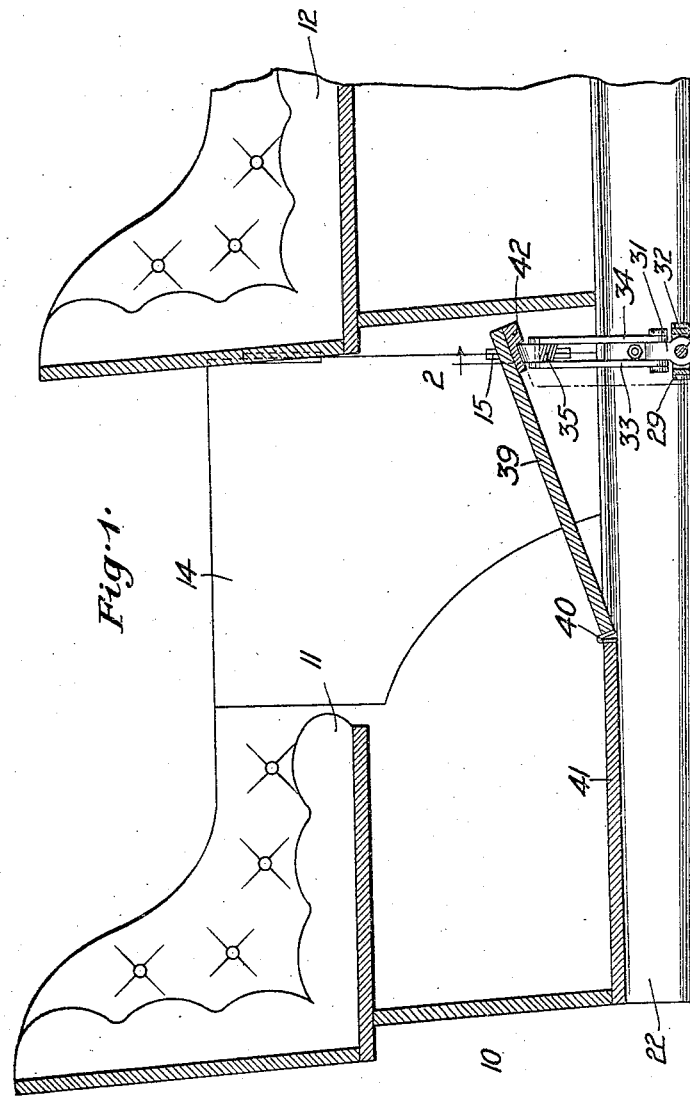
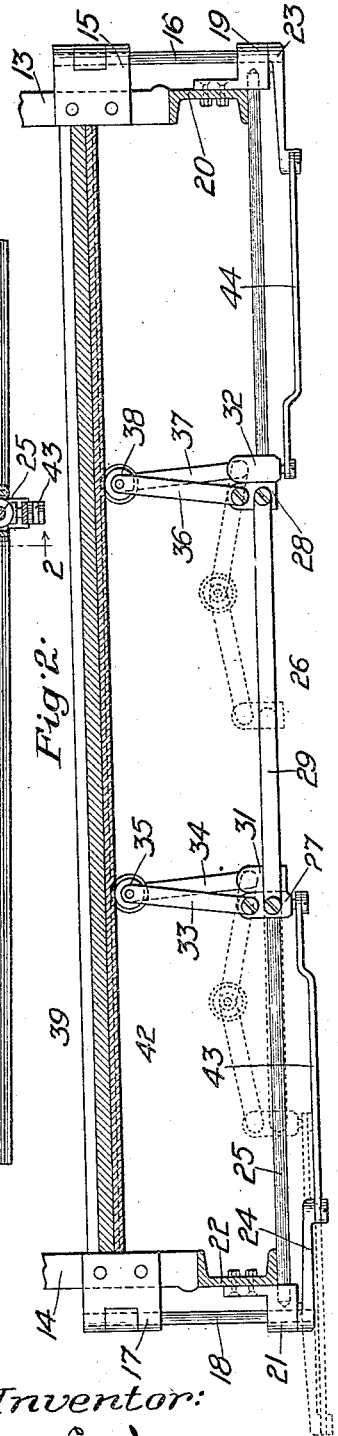
Witnesses:
Ernest A. Telfer
Walter L. Pierce
Inventor:
Louis A. Jones.

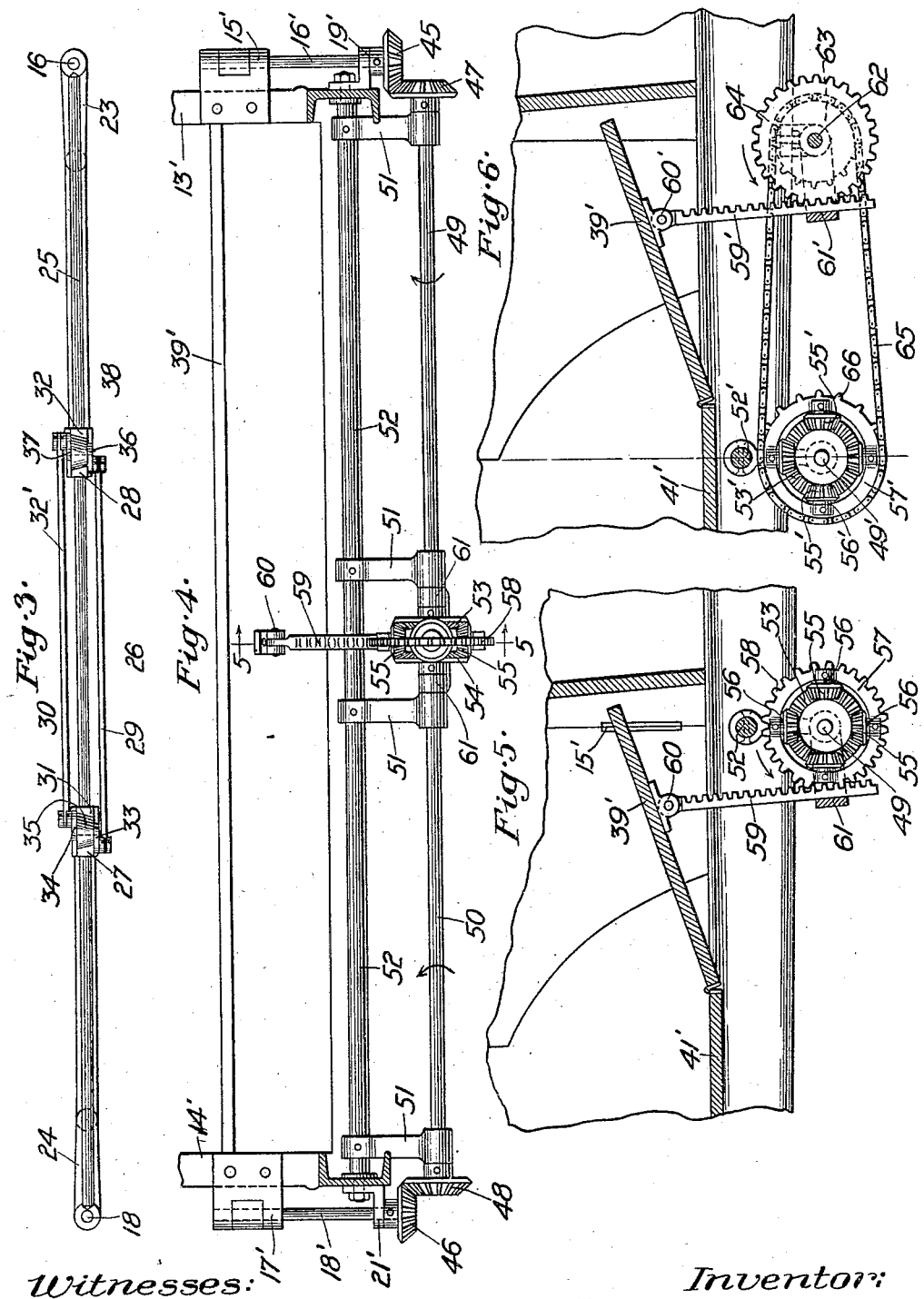

UNITED STATES PATENT OFFICE.

LOUIS A. JONES, OF CAMBRIDGE, MASSACHUSETTS.

FOOT-REST FOR VEHICLES.

No. 879,646.  Specification of Letters Patent.  Patented Feb. 18, 1908.

Application filed February 20, 1907. Serial No. 358,512.

*To all whom it may concern:*

Be it known that I, LOUIS A. JONES, a citizen of the United States, residing at Cambridge, in the county of Middlesex and State of Massachusetts, have invented new and useful Improvements in Foot-Rests for Vehicles, of which the following is a specification.

This invention relates to improvements in foot-rests for vehicles.

In vehicles, and particularly in motor vehicles, foot-rests add a great deal to the comfort of riding, but owing to the location of the side doors, such foot-rests are in the way while persons are getting into or out of the vehicle, and it is necessary to lower the foot-rest to the level of the floor in order that persons may easily pass through the doors. After the passengers are seated, it is necessary for the driver or some other person to raise the foot-rest into the proper position for use, and when the passengers wish to alight it is necessary that the foot-rest shall be lowered.

The object of my invention is to do away with the necessity of operating the foot-rest by hand and to that end I provide mechanism operatively connecting the foot-rest to the doors so that the opening movement of either of the doors lowers the foot-rest and the closing movement raises the foot-rest.

The invention consists in the combination and arrangement of parts set forth in the following specification and particularly pointed out in the claims thereof.

Referring to the drawings: Figure 1 is a longitudinal vertical section, partly in elevation, of a vehicle body showing my improved foot-rest and the mechanism for operating it. Fig. 2 is a section taken on line 2—2 of Fig. 1, looking toward the right. Fig. 3 is a detail plan of a portion of the mechanism shown in Figs. 1 and 2. Fig. 4 is a transverse vertical section of a vehicle body showing a modified form of my invention. Fig. 5 is a section, partly in elevation, taken on line 5—5 of Fig. 4, looking toward the right. Fig. 6 is a section similar to Fig. 5 showing still another modified form of my invention.

Like numerals refer to like parts throughout the several views of the drawings.

In the drawings, referring now to Figs. 1, 2, and 3, 10 is a vehicle body having seats 11 and 12 extending transversely thereof. Two doors 13 and 14 are located at opposite sides, respectively, of the body 10, the door 13 being provided with a hinge 15 having a pivotal pin 16 adapted to be rotated by the door 13, while the door 14 is provided with a hinge 17 having a pivotal pin 18 adapted to be rotated by the door 14. The lower end of the pivotal pin 16 is journaled in a bracket 19 fast to the side member 20 of the frame of the vehicle, while the lower end of the pivotal pin 18 is journaled in a bracket 21 fast to the side member 22 of the frame of the vehicle. Two arms 23 and 24 are fast to the pivotal pins 16 and 18, respectively.

A guide rod 25 extends transversely of the body 10, the ends of said guide-rod terminating in the brackets 19 and 21, respectively. A slide 26 comprising two blocks 27 and 28 connected by a link or tie 29, is adapted to slide on the guide-rod 25. A slide 30 comprising two blocks 31 and 32 connected by a link or tie 32′, is adapted to slide on the guide-rod 25. Two links 33 and 34 are pivotally connected at their lower ends, respectively, to the blocks 27 and 31, while said links are pivotally connected to each other at their upper ends, a roll 35 being interposed between said upper ends. Two links 36 and 37 are pivotally connected at their lower ends, respectively, to the blocks 28 and 32, while the upper ends of said links are pivotally connected to each other, there being a roll 38 interposed between said upper ends. A foot-rest 39 is hinged or pivoted at 40 to the floor 41 of the body 10, said pivot extending transversely of said body. The rolls 35 and 38 are adapted to travel on an inverted track 42 fast to the foot-rest 39. A link 43 is pivotally connected at its opposite ends, to the arm 24 and to the block 27, while a link 44 is pivotally connected at its opposite ends, respectively, to the arm 23 and to the block 32.

The general operation of the form of my invention hereinbefore specifically described is as follows: The doors 13 and 14 are normally closed and the foot-rest 39 is normally raised as shown. Persons sitting on the seat 11 may place their feet on the foot-rest 39 and are thus enabled to brace themselves against the back of said seat to insure comfort in riding, this being especially advantageous in traveling down grades or over rough roads.

When the vehicle is at rest, and passengers desire to enter or leave the vehicle they may do so by opening either of the doors 13 or 14, in which case the foot-rest 39 is automatically lowered until its upper face lies in the plane of the upper face of the floor 41, the operation of the mechanism being as follows: When the door 14 is opened, it is preferably swung through an arc of 180° and the arm 24 therefore swings from the position shown in full lines, Fig. 2, to the position shown in dotted lines. The arm 24 being connected by the link 43 to the block 27 moves the slide 26 toward the left, Figs. 2 and 3, thereby moving the links 33, 34, 36 and 37 and the rolls 35 and 38 to the position shown in dotted lines, Fig. 2. The foot-rest 39, which rests by its weight on the rolls 35 and 38, is consequently permitted to fall until its upper face is in alinement with the upper face of the floor 41. The foot-rest 39 when in its lowered position leaves an unobstructed passage through the doorway. When the door 13 is opened a similar action takes place, it being understood that the slide 26 remains stationary while the slide 30 is moved toward the right (Figs. 2 and 3), thereby stretching the links 33, 34, 36, and 37 out toward the right and permitting the foot-rest 39 to lower.

Referring now to Figs. 4 and 5 showing a modified form of my invention, two doors 13' and 14' are provided with hinges 15' and 17', said hinges having pivotal pins 16' and 18' journaled at their lower ends in brackets 19' and 21'. Two bevel gears 45 and 46 are fast to the pivotal pins 16' and 18', respectively. The bevel gear 45 meshes into a bevel gear 47, while the bevel gear 46 meshes into a bevel gear 48, the bevel gears 47 and 48 being fast to shafts 49 and 50, respectively. The shafts 49 and 50 are journaled in a series of brackets 51 fast to a rod 50. What is commonly known as a differential gear is interposed between the shafts 49 and 50. Bevel gears 53 and 54 are fast to the shafts 49 and 50, respectively, said gears meshing into a series of bevel pinions 55. The pinions 55 are journaled in a series of suitable studs 56, respectively, said studs being fast to a ring or casing 57 of any suitable construction. The casing 57 usually completely incloses the gears 53 and 54 and the pinions 55, but in this instance, for the sake of clearness in illustrating the device I have shown the casing 57 as a mere ring. The casing 57 is provided on its periphery with a spur gear 58 which meshes into a rack 59 pivotally connected to a bracket 60 fast to the foot-rest 39'. A U-shaped guide 61 in which the rack 59 is adapted to slide is pivotally mounted on the shafts 49 and 50 and straddles the differential gearing.

The operation of the modified form of my invention hereinbefore specifically described is as follows: When the door 13' is opened the gear 53 is rotated by the connections between said door and said gear. The shaft 50 and gear 54 being held stationary, the pinions 55 are caused by the rotation of the gear 53 to rotate about the gear 54, thereby rotating the casing 57 and gear 58, in the direction of the arrow (Fig. 5). Consequently, the rack 59 is moved downwardly carrying with it the foot-rest 39' into alinement with the floor 41'. When the door 13' is closed, the reverse of the foregoing operation takes place and the foot-rest 39' is raised. When the door 14' is opened the action of the mechanism is similar to that just described, it being understood that the gear 53 is held stationary and the rotation of the gear 54 causes the pinions 55 to revolve about the gear 53 and thereby raising or lowering the foot-rest 39' according to the direction of rotation of the gear 54.

In many cases, the doors of vehicles instead of being pivoted at the front edge as in the forms above described, are pivoted at the rear edge, as shown in Fig. 6, in which case I modify the mechanism by providing a shaft 62 journaled in suitable bearings and providing a sprocket gear 63 and a spur gear 64 fast to said shaft, said spur gear meshing into a rack 59' pivotally connected to a bracket 60' fast to the foot-rest. A chain 65 connects the sprocket gear 64 to a sprocket gear 66 formed on the differential casing 57'. It will be understood that the operation of this form of my invention is similar to that of the form shown in Figs. 4 and 5, the chain 65 acting to impart the rotation of the casing 57' to the sprocket wheel 63, the shaft 62 and gear 64 thereby lowering or raising the foot-rest according as the door is opened or closed.

The device of my invention may take various forms according to the requirements and I do not desire to limit myself to the specific forms herein shown.

Having thus described my invention, what I claim and desire by Letters Patent to secure is:

1. An apparatus of the character described comprising in its construction a body, a movable foot rest located at all times within said body, a door pivoted to swing about a vertical axis, and mechanism operatively connecting said foot rest to said door.

2. An apparatus of the character described comprising in its construction a body, a door, a foot rest located at all times within said body, said foot rest adapted to swing about a horizontal axis, and mechanism operatively connecting said foot rest to said door.

3. In a vehicle body, a movable foot-rest, two doors pivoted to swing about vertical axes, and mechanism operatively connecting said foot-rest to said doors.

4. In a vehicle body, a foot-rest pivoted to swing about a horizontal axis, two doors pivoted to swing about vertical axes, and mechanism operatively connecting said foot-rest to said doors.

5. An apparatus of the character described comprising in its construction a body, a foot-rest pivotally mounted thereon with its axis extending transversely thereof, two doors pivotally mounted on said body with their axes substantially vertical, said doors being located at opposite sides, respectively, of said body, and mechanism operatively connecting said doors to said foot-rest.

6. An apparatus of the character described comprising in its construction a body, a foot-rest pivotally mounted on said body with its axis extending transversely thereof, a guide mounted on said body beneath said foot-rest, said guide extending transversely of said body, two slides mounted on said guide, two links pivotally connected at their lower ends to said slides, respectively, said links pivotally connected at their upper ends to each other, a roll journaled on said links at the upper ends thereof, said roll adapted to support said foot-rest, two doors pivotally mounted on said body at opposite sides, respectively, thereof, two arms fast to the pivots of said doors, respectively, and two links connecting said arms to said slides, respectively.

In testimony whereof I have hereunto set my hand in presence of two subscribing witnesses.

LOUIS A. JONES.

Witnesses:
 CHARLES S. GOODING,
 ANNIE J. DAILEY.